United States Patent
Hovstøet al.

(10) Patent No.: US 6,776,280 B2
(45) Date of Patent: Aug. 17, 2004

(54) GUIDANCE UNIT FOR CONVEYOR BELT

(75) Inventors: Kenneth Hovstø, Heistad (NO); Kjell Arne Gaarden, Herøya (NO)

(73) Assignee: Martin Engineering Company, Neponset, IL (US)

(*) Notice: Subject to any disclaimer, the term of this patent is extended or adjusted under 35 U.S.C. 154(b) by 0 days.

(21) Appl. No.: 10/220,053

(22) PCT Filed: Jan. 4, 2002

(86) PCT No.: PCT/NO02/00004
§ 371 (c)(1),
(2), (4) Date: Sep. 29, 2003

(87) PCT Pub. No.: WO02/053478
PCT Pub. Date: Jul. 11, 2002

(65) Prior Publication Data
US 2004/0050671 A1 Mar. 18, 2004

(30) Foreign Application Priority Data
Jan. 5, 2001 (NO) .......................... 2001-0100

(51) Int. Cl.⁷ .............................. B65G 39/16
(52) U.S. Cl. .................. 198/806; 198/810.03; 198/840
(58) Field of Search ............... 198/806, 807, 198/810.03, 840

(56) References Cited

U.S. PATENT DOCUMENTS

| 2,511,194 | A | | 6/1950 | Blaber | |
| 2,655,252 | A | * | 10/1953 | Spurgeon | 198/806 |
| 3,066,547 | A | * | 12/1962 | Evans et al. | 198/806 |
| 3,368,665 | A | * | 2/1968 | Jinkins | 198/806 |
| 3,621,728 | A | | 11/1971 | Steorts, Jr. | |
| 5,358,098 | A | * | 10/1994 | Sundstrom et al. | 198/806 |
| 5,743,378 | A | * | 4/1998 | Hovst.o slashed. et al. | 198/806 |
| 5,950,806 | A | * | 9/1999 | Warneke | 198/806 |
| 6,186,317 | B1 | | 2/2001 | Hovsto et al. | |
| 6,405,854 | B1 | * | 6/2002 | Cumberlege | 198/806 |

FOREIGN PATENT DOCUMENTS

| DE | 174491 | 10/1905 |
| DE | 19514849 | 10/1996 |
| DE | 195 14 849 | 10/1996 |
| DE | 19514894 | 10/1996 |
| FR | 2 728 248 | 6/1996 |
| FR | 2728248 | 6/1996 |
| JP | 9020415 | 1/1997 |
| NZ | 220384 | 5/1987 |

* cited by examiner

Primary Examiner—Richard Ridley
(74) Attorney, Agent, or Firm—Barnes & Thornburg LLP (57) ABSTRACT

The present invention relates to a belt guidance unit for centring a conveyor belt, which during operation is susceptible to lateral displacement away from a neutral position in its longitudinal direction. According to the invention the belt guidance unit can be employed on conveyor belts that move in one direction as well as in two opposite directions with only very slight alterations and the basic constructional features of the belt guidance unit are substantially identical in the two operational situations.

16 Claims, 5 Drawing Sheets

GUIDANCE UNIT FOR CONVEYOR BELT

The present invention relates to a belt guidance unit for centring a conveyor belt, which during operation is susceptible to lateral displacement away from a neutral position in its longitudinal direction. According to the invention the belt guidance unit can be employed on conveyor belts that move in one direction as well as in two opposite directions with only very slight alterations and the basic constructional features of the belt guidance unit are substantially identical in the two operational situations.

The belt guidance unit according to the present invention is used for guiding conveyor belts particularly in the field of processing plants for various types of materials in bulk format, such as granulated ores, etc.

In connection with plants where such conveyor belts are employed, it is known that for various reasons the belts "wander" laterally on rollers and along their tracks. This is due in part to uneven loading, partly to misalignment of supports and rollers and often a combination of several different factors that produce a random pattern of movement for lateral movement of the belt. This lateral movement may be defined as a deviation from a basic neutral position where the belt travels in its longitudinal direction along an imaginary centre line or other kind of desired path over rollers or guides. Lateral movement in the belt will move the belt to the side of this neutral position or path for the belt, whereupon it should be restored to this neutral position. This creates the need for a guiding device that senses when the belt is out of the neutral position, whereupon it corrects the belt's travel in its longitudinal direction, thus returning the belt to the neutral position. This should also be a dynamic correction device that constantly corrects the belt relative to positions on both sides of the neutral position as well as preferably in relation to both directions of travel in the belt's longitudinal direction.

A belt guidance unit for the above-mentioned tasks and areas of application should furthermore be simple and robust to operate while it must be easy to install and adjust before use. The construction should furthermore be capable of being adapted to the existing conditions and loads either by employing different dimensions for the constructional parts or by being able to adjust the design of the constructional parts that are already installed in an existing system, such as, e.g., rollers, guides, mounting brackets, etc.

A belt guidance unit, moreover, should be able to be adapted for a conveyor belt that moves in one or two directions without major constructional alterations.

From previously known solutions within the field, a device may be mentioned for conveyor belts that travel over rollers or supports, described in DE 174 491, which device corrects for lateral displacements that occur in the belt during operation, causing the belt to be returned to its neutral position. A set of guide rollers for the conveyor belt is mounted on a plate, which is rotatably attached to the base. To the rotatable plate is mounted an arm with a tie bar. The arm may be articulated and rotatable about a pivot that is attached to the base. To the tie bar are attached guide rollers, which move along the edge of the conveyor belt and which, in the event of lateral displacement of the belt, transfer the movement to the tie bar. The movement is transferred to the lever arm, which in turn transfers the movement to the plate, thus causing the guide rollers' axes to be tilted and returning the conveyor belt to its neutral position.

The belt guidance unit described in NO 178 853 is a known solution of a similar type, but where the lever arm is rotatably attached both to the plate holding the guide rollers and the tie bar holding the guide rollers. The lever arm is rotatably attached to a fixed point located at a distance from the rotatable attachments in the plate and the tie bar, and a rotatably parallel stay is mounted parallel to the lever arm, between the tie bar and a fixed base in the form of a beam, with the result that the tie bar always remains at right angles relative to the conveyor belt's centre line.

In NO 306 708, moreover, a reversible belt guidance unit is described for centring conveyor belts, which during operation are susceptible to a lateral displacement away from a neutral position, comprising a rotating mechanism, which carries at least one guide roller for the conveyor belt, and which is rotatably mounted in a first fixed beam, which rotatable mounting is arranged about an axis that is perpendicular to the conveyor belt. Furthermore, a first set of guide rollers abuts against the conveyor belt's lateral edges, thereby being displaced laterally depending on the conveyor belt's lateral displacement, and the belt guidance unit comprises a first transfer mechanism for transferring the lateral displacement of the first set of guide rollers to the rotating mechanism, for rotating the guide roller to a position where it guides the conveyor belt towards the neutral position.

Known belt guidance units of the type described in DE 174 491 and the like have a tendency to produce rolling and skewed travel in the conveyor belt, particularly when there is uneven loading or uneven weight distribution, resulting in wear along the edge of the belt.

Compared to these other known belt guidance units, the belt guidance unit known from NO 178 853 provides a far smoother movement of the conveyor belt, resulting in less wear and a longer life for the belt. The belt guidance unit described in NO 178 853, however, only works when the belt moves in one direction, which is not sufficient for a number of purposes.

Furthermore, the belt guidance unit from NO 306 708 is designed so as to work with conveyor belts that move in two opposite directions.

The above-mentioned solutions, however, are relatively complicated in their mechanisms for producing movement and the solutions are therefore expensive and complicated with regard to mounting and adjustment, while also requiring some inspection.

It is therefore an object of the present invention to provide a guide device or a belt guidance unit according to the above wishes and requirements that counteracts the disadvantages and defects attached to previously known solutions.

The belt guidance unit for centring a conveyor belt according to the present invention guides a conveyor belt, which during operation is susceptible to lateral displacement relative to a longitudinal neutral position.

The belt extends over a guide roller mounted substantially across the belt's direction of travel, which guide roller is rotatably mounted in a holder about an axis substantially across the belt's direction of travel, which holder for the guide roller is rotatably mounted on a base about a substantially perpendicularly extending axis relative to the conveyor belt's direction of travel. According to the present invention, between the holder for the guide roller and the base there is mounted a rotationally elastic element, which in a neutral position gives the holder for the guide roller a rotational displacement to a first side relative to the conveyor belt's direction of travel. The rotationally elastic element is tightened when the holder is brought towards a neutral position relative to the conveyor belt's direction of travel. Furthermore, in connection with the holder or the guide roller, at a distance from the holder's rotational axis about the base, there is mounted at least one arm with a guide device at a distance from the holder, which guide device is mounted at the conveyor belt's lateral edge.

In an alternative embodiment for conveyor belts that move in two opposite directions (reversible conveyor belts), the conveyor belt is guided by the belt guidance unit, which conveyor belt is susceptible during operation to lateral displacement relative to a longitudinal neutral position. The belt extends over a guide roller mounted substantially across the belt's direction of travel, which guide roller is rotatably mounted in a holder about an axis substantially across the belt's direction of travel, which holder for the guide roller is rotatably mounted on a base about a substantially perpendicularly extending axis relative to the conveyor belt's direction of travel. According to the present invention, between the holder for the guide roller and the base there is mounted a rotationally elastic element, which in a neutral position gives the holder for the guide roller a rotational displacement to a first side relative to the conveyor belt's direction of travel. The rotationally elastic element is tightened when the holder is brought towards a neutral position relative to the conveyor belt's direction of travel. Furthermore, in connection with the holder or the guide roller, at a distance from the holder's rotational axis about the base, there is mounted at least one arm in each of the conveyor belt's directions of travel with a guide device at a distance from the holder, which guide device is mounted at the conveyor belt's lateral edges.

In a preferred embodiment the guide device is mounted in such a manner relative to the belt, which extends over the guide roller, that one lateral edge of the belt substantially abuts against the roller and when the belt moves towards the roller, the holder is rotated about the vertical axis relative to the base against the force in the rotationally elastic element. In an embodiment the rotationally elastic element is a spiral spring or the like, one end of which is securely fixed to the part of the holder and the other end is attached to the base. The rotationally elastic element will therefore be able to be "extended" between the part and the base, and considering that the "neutral", (relaxed) position of the rotationally elastic element gives the guide roller an initial rotational displacement, it is obvious that the rotationally elastic element will be "extended" when the side of the belt pushes the guide device on the side of the holder, thus causing the guide roller to rotate substantially across the belt's longitudinal direction. The moment acting on the holder and thereby the guide roller from the pre-tensioned force in the rotationally elastic element and the moment that is produced by the force that the belt exerts on the guide device on the belt's side will then counteract each other in a continuous dynamic play of force. If the belt moves to one side towards the guide device on account of uneven loading, the pressure on the guide device from the belt's lateral edge will be reinforced, whereupon the holder and the guide roller are rotated about the vertical axis as a result thereof. The rotation of the guide roller will thereby guide the belt away from the guide device. It is therefore essential that the belt should move in the opposite direction relative to the direction to which the guide device points from the holder. If on the other hand the belt moves from the guide device to the opposite side, the force on the guide device will diminish, whereupon the pre-tensioned rotationally elastic element will rotate the holder and thereby the guide roller towards its initial rotationally-displaced position. The guide roller will thereby rotate about the vertical axis and the belt will be guided towards the guide device. When the force on the guide device then creates a moment that counterbalances the moment created by the rotationally elastic element, the play of force is balanced once again and the belt moves in a straight line relative to the desired direction of travel.

In different embodiments the holder's initial rotational displacement to the first side on account of the rotationally elastic element may be in the range of 10–40 degrees. The angle will preferably be around 15 degrees but it may deviate depending on how strong a correction one wishes to achieve in the belt guidance unit.

In a preferred embodiment the ratio between the conveyor belt's width and the distance between the guide roller and the guide device's contact point with the belt's lateral edge is substantially 3:1. This ratio has been shown to be particularly favourable, providing a suitable relationship between a deflection as a result of the belt moving out of the neutral position and the corrective movement of the roller. The ratio may further be of the order of 2:1 to 5:1.

In one embodiment the guide device is a roller rotatably mounted about an axis substantially perpendicularly located relative to the conveyor belt's direction of travel. Furthermore, the length of the arm with the guide device may be adjusted in such a manner that the distance between the guide device's contact point with the conveyor belt and the holder for the guide roller can be adapted to the width of the conveyor belt. In order to preserve the relationship between the conveyor belt's width and the distance between the guide roller and the guide device, the arm with the guide device is adjustable in its longitudinal direction as a telescopic device along a rail or the like.

The rotationally elastic element may be formed in many different ways and in different embodiments the rotationally elastic element may be in the form of various types of spring. The rotationally elastic element may be a spiral spring, or the rotationally elastic element is an elastic element selected from a group consisting of rubber, polymers, etc.

In a further embodiment the guide roller on the belt guidance unit may be a standard roller ordinarily employed in the conveyor belt system, with the holder adapted to its width, diameter and position. With a belt guidance unit according to the present invention this adaptation can easily be accomplished since there are a small number of constructional parameters to take into consideration in the design of the holder for the guide roller, since it in turn only requires to be rotatably mounted relative to a base, between which the rotationally elastic element is located.

As already mentioned, a belt guidance unit according to the present invention may be employed with reversible conveyor belts that move in two opposite directions over the guide roller, without the necessity of operative or constructional alterations to the guidance unit.

The initial rotational displacement of the guide roller will at all times guide the belt in a lateral direction and in order to achieve a dynamic continuous guidance of the belt in both lateral directions, the moment in the rotational movement of the guide roller caused by the rotationally elastic element must be counterbalanced by a moment created by a guide device at the belt's lateral edge(s).

This means that with a reversible belt there must be provided two guide devices as mentioned above, which guide the belt by means of a generated moment that rotates the guide roller independently of the direction in which the belt is moving. As mentioned above, this is solved by providing a guide device in each direction protruding outwardly at a distance from the guide roller (approximately ⅓ of the width of the roller's contact with the belt).

In an embodiment with a reversible belt as mentioned above, the distance between the guide devices' contact points with the respective lateral edges of the belt must be adapted in such a manner that the guide roller can rotate substantially to the maximum deviation during guidance of the belt, without the guide devices on each side of the belt coming into conflict with the belt. This means that in a neutral position, where it extends in its direction of travel with one lateral edge abutting against a guide device, on the opposite side there is a distance between the belt and the second guide device. Thus the distance between the contact points against the belt's lateral edges on each of the guide devices will be greater than the width of the belt. When the guide roller then rotates as the belt is being guided, only one of the guide devices substantially comes into contact with the belt.

Different embodiments of the belt guidance unit according to the present invention are further described in greater detail below with reference to the attached figures, in which.

Figure 1:
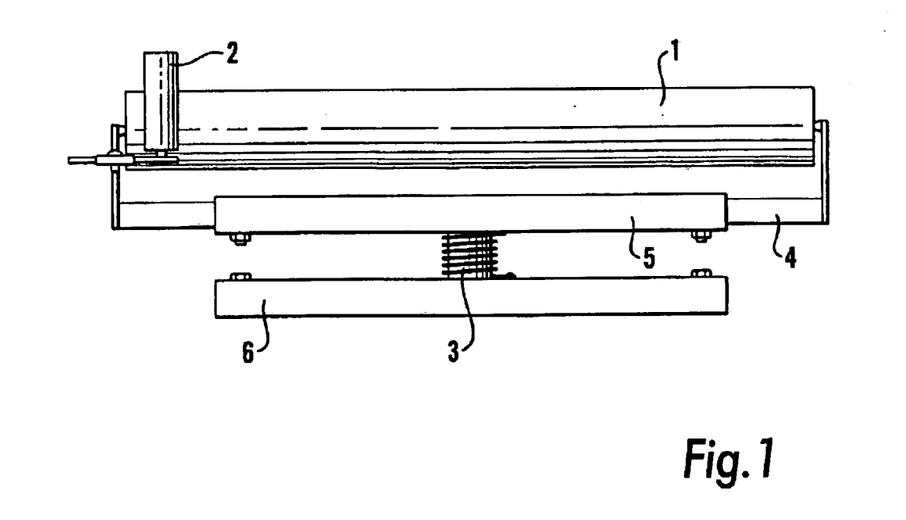
FIG. 1 is a plan view from in front illustrating an embodiment of a belt guidance unit for a conveyor belt that moves in one direction, according to the present invention.

FIG. 1 illustrates a belt guidance unit according to the present invention consisting substantially of a guide roller 1 rotationally mounted in a holder 4, with the result that the guide roller 1 rotates about a substantially horizontal axis across the belt's (not shown) direction of travel and longitudinal direction. The holder 4 also has a centrally located part 5, which is connected to a base 6 via a rotationally elastic element, rotatably about a vertical axis 3 where the part 5 and thereby the holder 4 and the guide roller 1 rotate relative to the base 6 about a substantially vertical axis perpendicularly to the belt's longitudinal direction, according to the present invention.

As illustrated in FIG. 1, the width of the holder 4 can be changed with the part 5, thus enabling the holder 4 to be adapted to different guide rollers of different width. Thus it will be possible to adapt the holder 4 to an existing roller in a conveyor system, or it may be possible to change a belt guidance unit according to the present invention by reconstructing or adapting a conveyor system.

Figure 2:
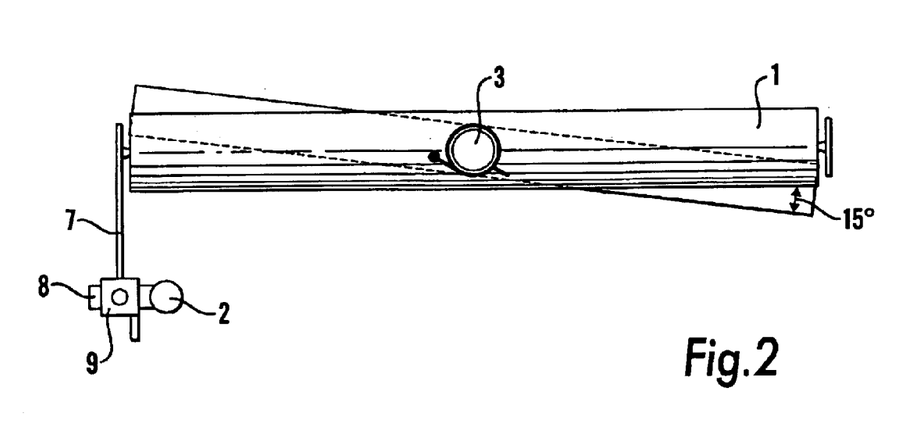
FIGS. 2–4 are a plan view from above illustrating different embodiments of a belt guidance unit for a conveyor belt, according to the present invention.

As is further illustrated in FIG. 2, the rotationally elastic element is located about the vertical axis 3 and is mounted in such a manner that it gives the guide roller an initial angular displacement of approximately 15 degrees in a first direction. The guide roller 1 will guide the upper belt (not shown) by means of its angular displacement about the vertical axis and this initial angular displacement relative to the base 6 will thereby help to guide the belt relative to its longitudinal direction and direction of travel over the base 6.

In FIGS. 1 and 2 there is further illustrated a guide device consisting of an arm 7 with a holder 8, 9 and a roller 2 mounted on a side of the holder 4, 5 and thereby the guide roller 1. The roller 2 is mounted in such a manner relative to the belt, which extends over the guide roller 1, that one lateral edge of the belt abuts against the roller 2 and when the belt moves towards the roller 2, the holder 4, 5 is rotated about the vertical axis 3 relative to the base 6 against the moment exerted by the rotationally elastic element that is located around the vertical axis 3. In this embodiment the rotationally elastic element is a spiral spring or the like, one end of which is securely fixed to the part 5 of the holder 4 and the other end is attached to the base 6. The rotationally elastic element will therefore be able to be "stretched" between the part 5 and the base 6, and considering that the "neutral", (relaxed) position of the rotationally elastic element gives the guide roller an initial rotational displacement of approximately 15 degrees, it is obvious that the rotationally elastic element will be "stretched" when the side of the belt pushes the guide device on the side of the holder 4, thus causing the guide roller to rotate substantially across the belt's longitudinal direction. The moment acting on the holder 4 and thereby the guide roller 1 from the pre-tensioned force in the rotationally elastic element and the moment that is produced by the force exerted by the belt on the guide device on the belt's side will then counteract each other in a continuous dynamic play of force. This applies even though the belt moves in two opposite directions (reversible belt).

If the belt moves to one side against the guide device on account of uneven loading, the pressure on the guide device's roller 2 from the belt's lateral edge will be reinforced, whereupon the holder 4 and the guide roller are rotated about the vertical axis 3 as a result thereof. The rotation of the guide roller 1 will thereby guide the belt away from the guide device. It is therefore essential that the belt should move in the opposite direction relative to the direction to which the guide device points from the holder 4. If on the other hand the belt moves from the guide device to the opposite side, the force on the guide device will diminish, whereupon the pre-tensioned rotationally elastic element will rotate the holder 4 and thereby the guide roller 1 towards its initial rotationally-displaced position and the guide roller will thereby rotate about the vertical axis 3 and the belt will be guided back towards the guide device. When the force on the guide device then creates a moment that counterbalances the moment created by the rotationally elastic element, the play of force is balanced once again and the belt moves in a straight line relative to the desired direction of travel.

Figure 3:
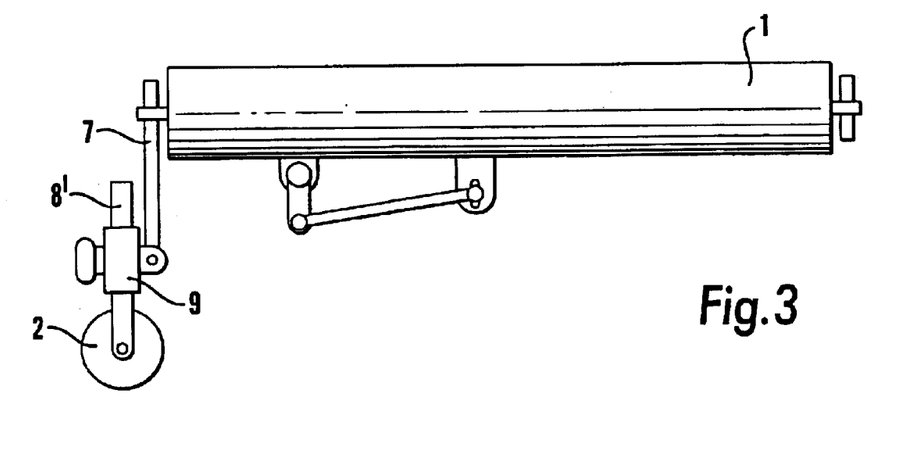
Figure 4:
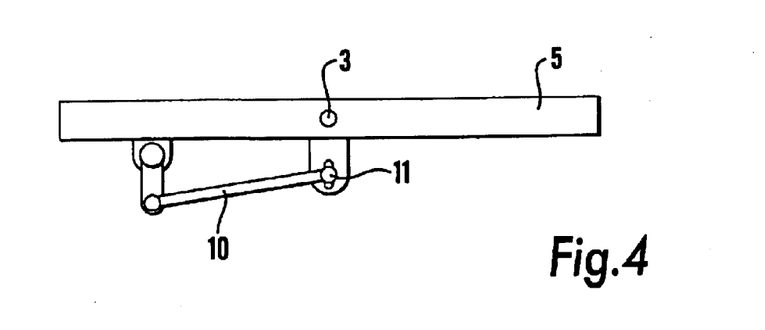

In different alternative embodiments the rotationally elastic element can be designed in a great many different ways. As illustrated in FIGS. 3 and 4 the rotationally elastic element is pushed to the side relative to the vertical axis 3, influencing the part 5 and thereby the guide roller 1 via a stay 10 that is attached to a lever arm 11. The advantage of this solution is that the rotationally elastic element is mounted in such a fashion that it can easily be replaced or inspected without any special dismantling. This contrasts with the spiral spring in FIG. 1, which requires considerably more dismantling when being replaced. The drawback with the arrangement in FIGS. 3 and 4, of course, is that it involves more components.

The rotationally elastic element in FIGS. 3 and 4 may, for example, be a spiral spring, it may be an elastic element such as rubber or the like or another kind of rotationally elastic device, driven, controlled or braked hydraulically, pneumatically or mechanically.

The pre-tensioning of the rotationally elastic element may further be altered by loosening the attachment, the rotationally elastic element's pre-tensioning is altered and the attachment is tightened. If the rotationally elastic element is a spiral spring or the like, this can be done, e.g. by providing a lever arm or the like in connection with the spring. If the rotationally elastic element is made of a synthetic material, rubber or the like, this element can be replaced by an additional element with different rotational resistance, rigidity or the like.

Figure 5:
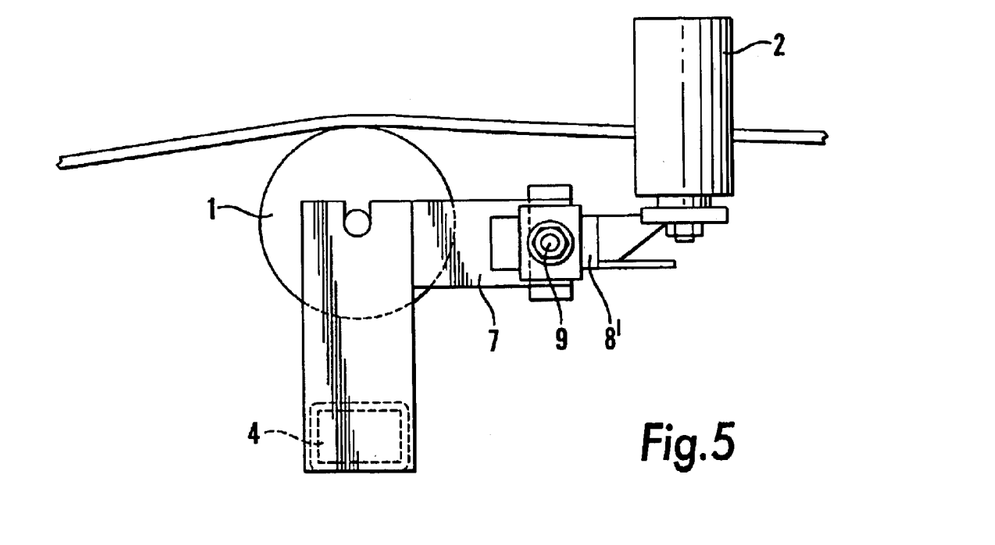
FIGS. 5 and 6 are a plan view from the side illustrating different embodiments of an arm with a guide device, according to the present invention.
Figure 6:
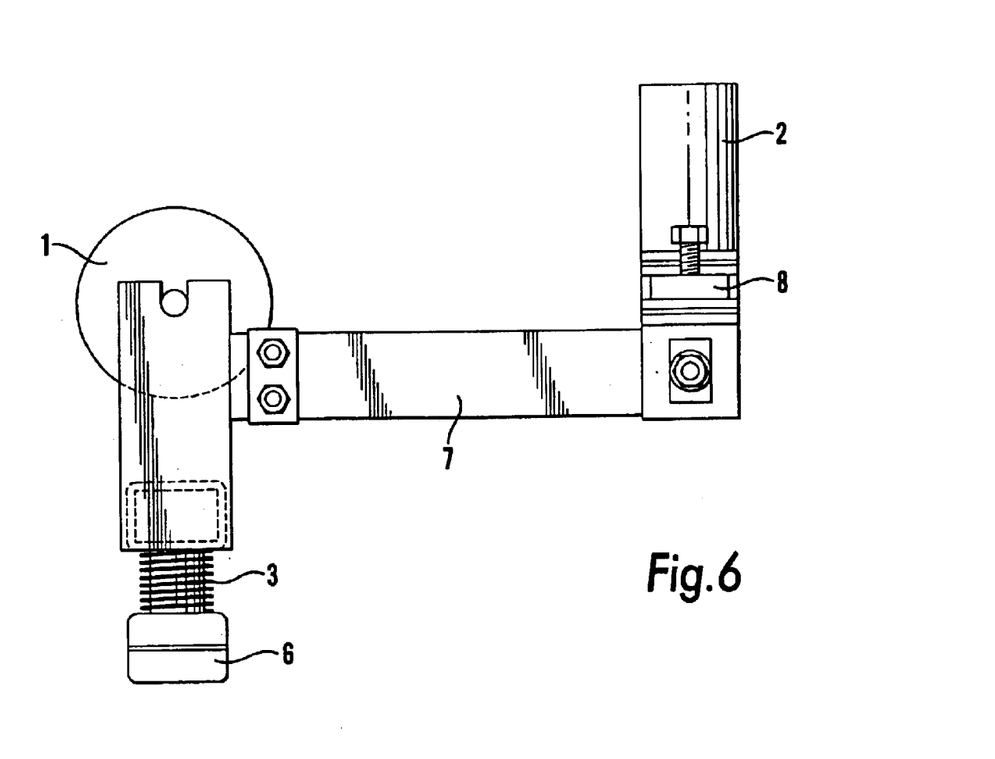

In FIG. 3 there is further illustrated an alternative embodiment with regard to the guide device 7, 8', 9 where the roller 2 can be moved in the belt's longitudinal direction as well as across the belt's longitudinal direction. This is particularly suitable for adapting to different belt widths and loads and in addition permits the roller 2 to be adjusted relative to the belt's lateral edge, with the result that the play of force between the guide device and the rotationally elastic element is correctly balanced so that the belt moves in a straight line in its longitudinal direction. This is also illustrated in greater detail in FIGS. 5 and 6 where the roller 2 can be moved relative to the holder 4 and thereby the guide roller 1 in the belt's longitudinal direction along the rail 7 and towards or away from the belt's lateral edge along the rail 8 or 8'. As illustrated in the figure the rail 8' is slanting towards the belt's lateral edge.

When adjusting the roller's 2 position, moreover, it is important that the ratio between the belt's width and the guide device's roller is kept as far as possible within the preferred range of around 3:1.

Figure 7:
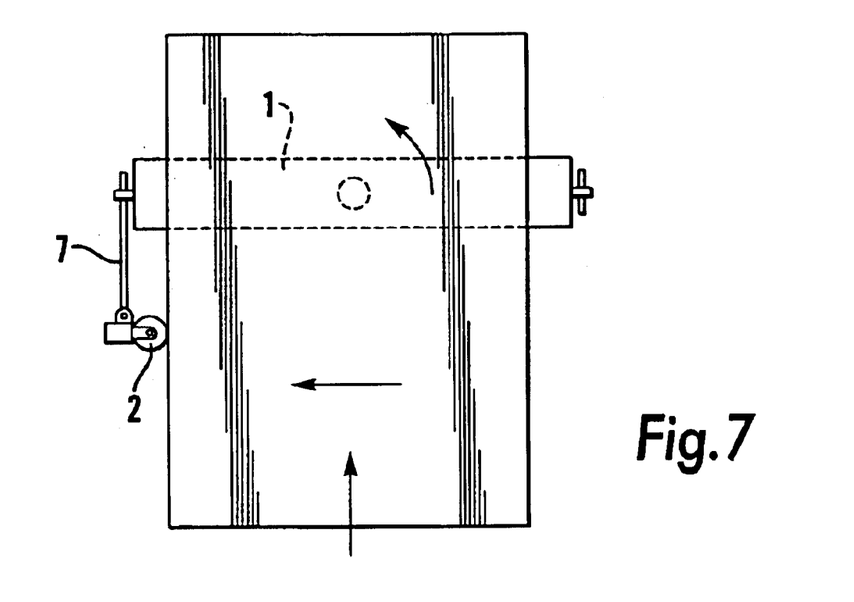
FIGS. 7 and 8 are a plan view from above illustrating the pattern of movement of a belt guidance unit according to the present invention, during operation.
Figure 8:
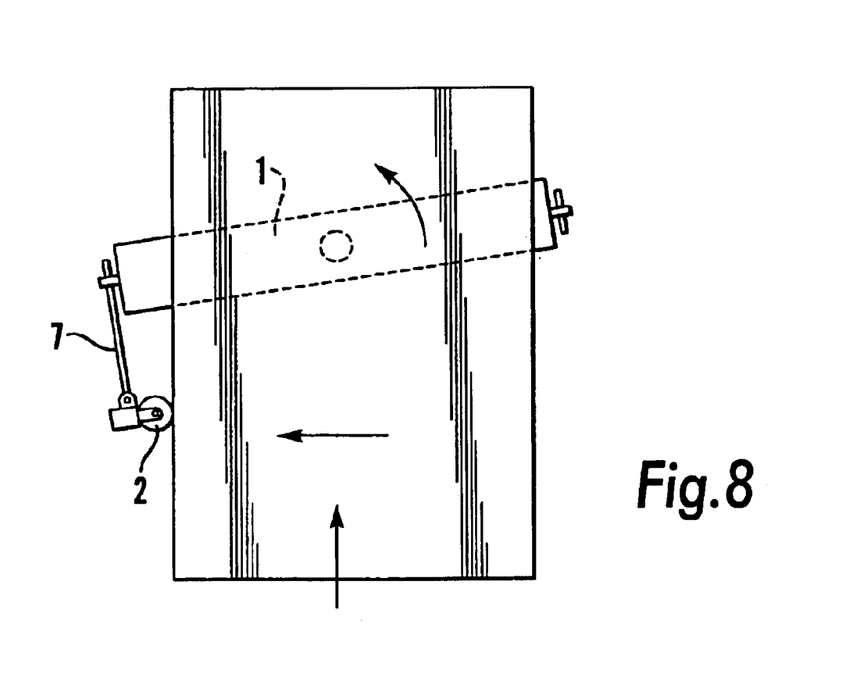

In FIGS. 7 and 8 it can be seen how a belt guidance unit according to the present invention works (as described above) where the belt in FIG. 7 moves towards the left, exerting an increased force on the roller 2, and producing a turning moment about the vertical axis 3 that exceeds the moment in the rotationally elastic element. The guide roller 1 then rotates in such a manner that the belt is guided in the opposite direction to the guide device and the roller 2, as illustrated in FIG. 8.

Figure 9:
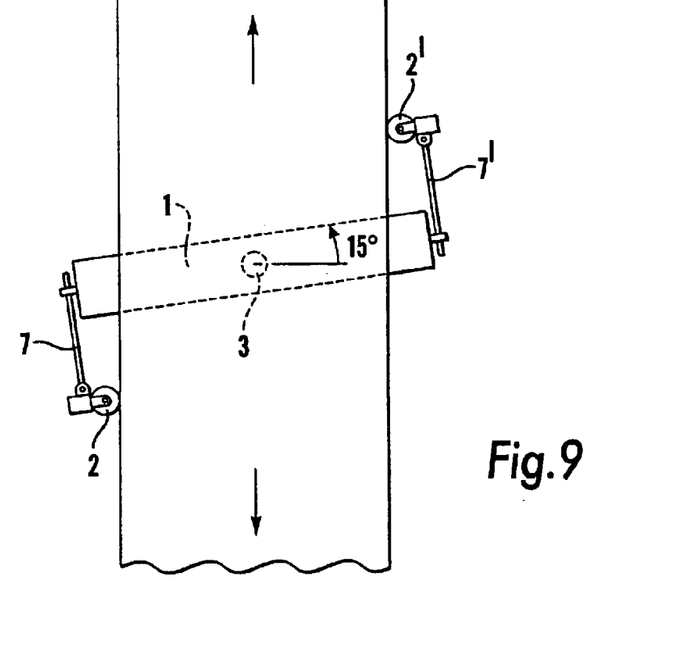
FIGS. 9 and 10 are a plan view from above illustrating the pattern of movement of a belt guidance unit for a reversible conveyor belt according to the present invention, during operation.
Figure 10:
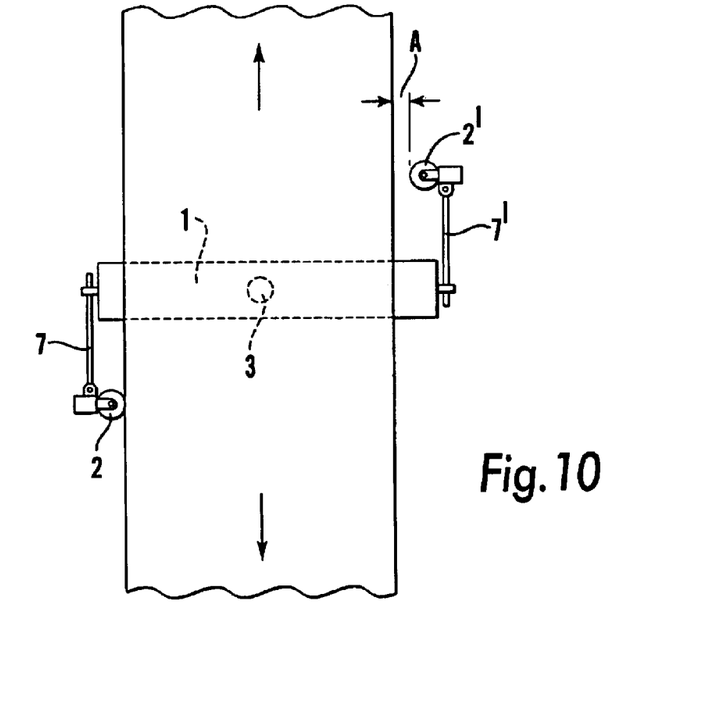

Similarly, in FIGS. 9 and 10 it is illustrated how the belt guidance unit as described above can be employed in connection with a reversible belt. In this case a guide device is provided on both sides of the belt, each of which guide devices protrudes outwardly in the direction of the belt's direction of travel. The initial rotational displacement of the guide roller 1 caused by the rotationally elastic element still creates the moment that guides the belt in a direction when, (depending on the direction of travel), the pressure on one of the rollers 2 on the guide devices is relieved. The different embodiments that are employed for guide device and rotationally elastic element for a belt travelling in one direction may, of course, also be used for a belt guidance unit for a belt travelling in two directions.

Furthermore, in FIG. 10 an embodiment with a reversible belt is illustrated where, as mentioned above, the distance between the guide devices' contact points with the respective lateral edges of the belt is adapted in such a manner that the guide roller can rotate substantially to maximum deviation (FIG. 9) during guidance of the belt without the guide devices on each side of the belt coming into conflict with the belt. This means that in a neutral position, where it runs in its direction of travel with one lateral edge abutting against a guide device 7, 2, on the opposite side the belt is at a distance A to the second guide device 7', 2'. Thus the distance between the contact points against the belt's lateral edges on each of the guide devices will be greater than the width of the belt. When the guide roller then rotates during guidance of the belt, only the guide device 7, 2 substantially comes into contact with the belt. The distance A has to be adjusted by mounting a belt guidance unit and this has to be changed if, e.g., the width of the belt is subsequently altered. If the rotationally elastic element is changed after mounting, it may also be necessary to change the distance between the guide devices since the maximum deviation of the guide roller may be altered.

When the reversible belt in FIG. 10 changes its direction of travel, the belt will thereby go from abutment against the guide device 7, 2 to abutment against the guide device 7', 2'. The guidance of the belt relative to lateral displacement will subsequently work as described above.

As long as providing the two guide devices 7, 2, 7', 2' in a reversible belt solution produces a moment in the same direction about the fulcrum 3, the guidance in the opposite direction will at all times be conducted by the rotationally elastic element, which is pre-tensioned and gives the guide roller an initial rotational displacement about the axis 3.

Further embodiments, adaptations and alterations that are obvious to a person skilled in the art with regard to the above should also naturally be considered to fall within the scope of that which is defined below in the patent claims.

What is claimed is:

1. A belt guidance unit for centring a conveyor belt, which during operation is susceptible to lateral displacement from a longitudinal neutral position, which belt extends over a guide roller mounted substantially across the belt's direction of travel, which guide roller is rotatably mounted in a holder about an axis substantially across the belt's direction of travel, which holder for the guide roller is rotatably mounted on a base about a substantially perpendicularly extending axis relative to the conveyor belt's direction of travel, characterised in that between the holder for the guide roller and the base there is mounted a rotationally elastic element, which in a neutral position gives the holder for the guide roller a rotational displacement to a first side relative to the conveyor belt's direction of travel, which rotationally elastic element is tightened when the holder is brought towards a neutral position relative to the conveyor belt's direction of travel, and that in connection with the holder or the guide roller; at a distance from the holder's rotational axis about the base, there is mounted at least one arm with a guide device at a distance from the holder, which guide device is mounted at the conveyor belt's lateral edge.

2. A belt guidance unit according to claim 1, characterised in that the ratio between the conveyor belt's width and the distance between the guide roller and the guide device is substantially 3:1.

3. A belt guidance unit according to claim 1, characterised in that the holder's rotational displacement to the first side is in the range of 10–40 degrees.

4. A belt guidance unit according to claim 1, characterised in that the guide device comprises a roller rotatably mounted about an axis substantially perpendicularly located relative to the conveyor belt's direction of travel.

5. A belt guidance unit according to claim 1, characterised in that the length of the arm with the guide device can be adjusted to enable the distance between the guide device's contact point with the conveyor belt and the holder for the guide roller to be adapted to the width of the conveyor belt.

6. A belt guidance unit according to claim 1, characterised in that the rotationally elastic element is a spring.

7. A belt guidance unit according to claim 1, characterised in that the rotationally elastic element is a spiral spring.

8. A belt guidance unit according to claim 1, characterised in that the rotationally elastic element is an elastic element selected from a group consisting of rubber and polymers.

9. A belt guidance unit for centring a conveyor belt, which during operation is susceptible to lateral displacement from a longitudinal neutral position, which belt extends over a guide roller mounted substantially across the belt's direction of travel, which guide roller is rotatably mounted in a holder about an axis substantially across the belt's direction of travel, which holder for the guide roller is rotatably mounted on a base about a substantially perpendicularly extending axis relative to the conveyor belt's direction of travel, characterised in that between the holder for the guide roller and the base there is mounted a rotationally elastic element, which in a neutral position gives the holder for the guide roller a rotational displacement to a first side relative to the conveyor belt's direction of travel, which rotationally elastic element is tightened when the holder is brought towards a neutral position relative to the conveyor belt's direction of travel, and that in connection with the holder or the guide roller, at a distance from the holder's rotational axis about the base, there is mounted at least one arm in each of the conveyor belt's directions of travel with a guide device at a distance from the holder, which guide devices are mounted at the conveyor belt's lateral edges.

10. A belt guidance unit according to claim 9, characterised in that the ratio between the conveyor belt's width and the distance between the guide roller and the guide device is substantially 3:1.

11. A belt guidance unit according to claim 9, characterised in that the holder's rotational displacement to the first side is in the range of 10–40 degrees.

12. A belt guidance unit according to claim 9, characterised in that the guide device comprises a roller rotatably mounted about an axis substantially perpendicularly located relative to the conveyor belt's direction of travel.

13. A belt guidance unit according to claim 9, characterised in that the length of the arm with the guide device can be adjusted to enable the distance between the guide device's contact point with the conveyor belt and the holder for the guide roller to be adapted to the width of the conveyor belt.

14. A belt guidance unit according to claim 9, characterised in that the rotationally elastic element is a spring.

15. A belt guidance unit according to claim 9, characterised in that the rotationally elastic element is a spiral spring.

16. A belt guidance unit according to claim 9, characterised in that the rotationally elastic element is an elastic element selected from a group consisting of rubber and polymers.

* * * * *